(12) United States Patent
Yang et al.

(10) Patent No.: US 8,993,680 B2
(45) Date of Patent: Mar. 31, 2015

(54) HYPERBRANCHED POLYETHYLENES AND A PROCESS FOR MAKING

(71) Applicant: ExxonMobil Research and Engineering Company, Annandale, NJ (US)

(72) Inventors: Yong Yang, Annandale, NJ (US); Andy Haishung Tsou, Allentown, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 116 days.

(21) Appl. No.: 13/721,372

(22) Filed: Dec. 20, 2012

(65) Prior Publication Data

US 2014/0179874 A1 Jun. 26, 2014

(51) Int. Cl.
| | |
|---|---|
| C08F 265/04 | (2006.01) |
| C08F 279/00 | (2006.01) |
| C08F 110/02 | (2006.01) |
| C08F 236/04 | (2006.01) |

(52) U.S. Cl.
CPC ........... *C08F 110/02* (2013.01); *C08F 236/045* (2013.01)
USPC ........ 525/245; 525/269; 525/324; 525/330.5; 525/331.9

(58) Field of Classification Search
USPC ........... 525/245, 267, 269, 324, 330.3, 331.9, 525/370, 374, 330.5
See application file for complete search history.

(56) References Cited

U.S. PATENT DOCUMENTS

| | | | |
|---|---|---|---|
| 4,284,835 A | 8/1981 | Kim et al. | |
| 4,980,331 A | 12/1990 | Hoxmeier et al. | |
| 2009/0253878 A1 | 10/2009 | Ye et al. | |
| 2013/0165358 A1* | 6/2013 | Yang et al. | 508/462 |

OTHER PUBLICATIONS

Abbas, M. et al. Macromolecular Symposia vol. 311 pp. 122-125 published online Jan. 25, 2012.*
Demel, S. et al. Macromolecular Rapid Communications vol. 24 pp. 636-641 published online Jun. 30, 2003.*
Shi, X. et al. Macromolecular Rapid Communications vol. 33 pp. 374-379 published online Jan. 24, 2012.*
The Development of L2X2Ru=CHR Olefin Metathesis Catalysts: An Organometallic Success Story, Tina M. Trnka and Robert H. Grubbs, Acc. Chem. Res., 2001, 34 (1), pp. 18-29.
Ruthenium-Based Heterocyclic Carbone-Coordinated Olefin Metathesis Catalysts, G.C. Vougioukalakis and R.H. Grubbs, Chem. Rev 2010, 110, 1746-1787.
Mechanistic Studies of the Palladium-Catalyzed Copolymerization of Ethylene and α—Olefins with Methyl Acrylate, S. Mecking, L.K. Johnson, Line Wang, and M. Brookhart, J. Am. Chem. Soc. 1998, 120, 888-899.
Late-Metal Catalysts for Ethylene Homo- and Copolymerization, S.D. Ittel and L.K. Johnson, Chem Rev. 200, 100, 1169-1203.
Rachapudy et al., Journal of Polymer Science: Polymer Physics Edition, vol. 17, 1211-1222 (1979).
Chain Walking: A New Strategy to Control Polymer Topology, Z. Guan, P. M. Cotts, E. F. McCord, S. J. McLain, Science 1999, 283, 2059.
Synthesis and characterization of hyperbranched polyethylenes containing cross-linking structures by chain walking copolymerization of ethylene with diacrylate comonomer, J. Ye, Z. Ye and S. Zhu, Polymer 2008, 49, 3382.
A Trinuclear Pd-Diimine Catalyst for "Core-First" Synthesis of Three-Arm Star Polyethylenes via Ethylene "Living" Polymerization, K. Zhang, Z. Ye and R. Subramanian, Macromolecules 2009, 42, 2313.

\* cited by examiner

*Primary Examiner* — Irina S Zemel
*Assistant Examiner* — Jeffrey Lenihan
(74) *Attorney, Agent, or Firm* — Robert A. Migliorini

(57) ABSTRACT

A process for making a hyperbranched polyethylene. The process has the steps of (a) reacting a multifunctional acrylate monomer with an α,ω-diene monomer in the presence of a first catalyst to form an alternating acrylate/diene copolymer and (b) reacting the alternating acrylate/diene copolymer with a late transition metal α-diimine catalyst to form a multi-nuclear initiator for chain walking polymerization of ethylene. There is also a process for forming a multi-nuclear initiator. There is also a hyperbranched polymer.

15 Claims, 3 Drawing Sheets

HYPERBRANCHED POLYETHYLENES AND A PROCESS FOR MAKING

FIELD

The present disclosure relates to hyperbranched polyethylenes. The present disclosure further relates to a process for making hyperbranched polyethylenes. The present disclosure further relates to a process for making a multi-nuclear initiator.

BACKGROUND

Hyperbranched polyethylenes are amorphous (extensive short- and long-chain branching prevent polyethylene segment crystallization) and exhibit many useful properties. Hyperbranched polyethylenes can be used as lubricant base stocks or as viscosity index improvers in lubricants or as viscosity modifiers in hydrocarbon fluids. Hyperbranched polyethylenes exhibit favorable anticipated temperature invariant coil dimension, shear and oxidative stability, and incompressibility at high pressure. The hyperbranched topology results in small coil dimension. Thus, the polyethylenes must be of very high molecular weight in order to thicken the lubricant when used as viscosity index improvers.

Hyperbranched polyethylenes have been synthesized previously by chain-walking polymerization catalyzed by late transition metal α-diimine catalysts. Due to the transitional state nature of the late transition metal catalyst and the requirement of low ethylene pressure to achieve hyper-branching, the molecular weight that can be achieved is limited. Raising the ethylene pressure can increase molecular weight, but branching density is severely compromised. Thus, attainment of both high molecular weight and hyper-branching has not been possible with the chain-walking polymerization mechanism. Difunctional acrylate crosslinking agents can be used to boost molecular weight in hyper-branched polyethylenes, but even a slight excess can result in gelation.

It would be desirable to have a method for making hyperbranched polyethylenes of high molecular weight.

SUMMARY

According to the present disclosure, there is a hyperbranched polymer. The polymer has a backbone of an alternating copolymer of a multifunctional acrylate monomer and a α,ω-diene monomer and a plurality of hyperbranched polyethylene branches.

According to the present disclosure, there is a process for making a hyperbranched polyethylene. The process has the steps of (a) reacting a multifunctional acrylate monomer with a α,ω-diene monomer in the presence of a first catalyst to form an alternating acrylate/diene copolymer, (b) reacting the alternating acrylateldiene copolymer with a second catalyst to form a multi-nuclear initiator, and (c) reacting the multi-nuclear initiator with ethylene.

According to the present disclosure, there is a process for making a multi-nuclear initiator. The process has the steps of (a) reacting a multifunctional acrylate monomer with a α,ω-diene monomer in the presence of a first catalyst to form an alternating acrylate/diene copolymer, (b) reacting the alternating acrylate/diene copolymer with a second catalyst to form a multi-nuclear initiator.

DETAILED DESCRIPTION

All numerical values within the detailed description and the claims herein are modified by "about" or "approximately" the indicated value, and take into account experimental error and variations that would be expected by a person having ordinary skill in the art.

In the present disclosure, high molecular weight hyperbranched polyethylenes are prepared by partially decoupling the branching and molecular weight build-up during chain walking polymerization. The process employs a new class of multi-nuclear late transition metal α-diimine initiators. The use of such initiators, which have multiple pendant initiating sites, enables the preparation of hyperbranched polyethylenes exhibiting both high molecular weight and a high degree of branching.

Hyperbranched polyethylenes of the present disclosure are obtained from novel reactive backbones derived from alternating copolymers of multi-functional acrylates and α,ω-dienes. The number of reactive sites per chain and the length of polymer backbone can be controlled by the feeding ratio of the multi-functional acrylate monomer to the α,ω-diene monomer. The spacing between two branching points can be controlled by selection of the species of α,ω-diene employed.

Figure 3:
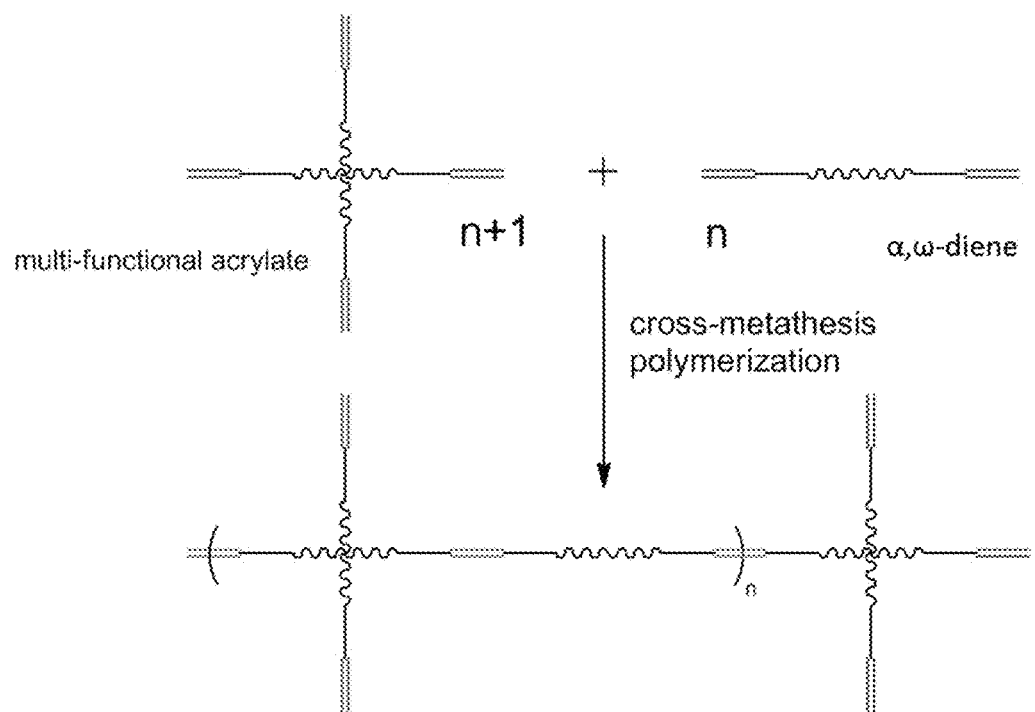
FIG. 3 depicts a reaction sequence for the synthesis of alternating acrylate/diene copolymer in the presence of a first catalyst.

An embodiment for making the alternating copolymers of multi-functional acrylates and α,ω-dienes is illustrated in FIG. 3. It utilizes cross-metathesis copolymerization of a multi-functional acrylate and an α,ω-diene to synthesize an alternating copolymer with controlled length. Multi-functional acrylates do not homocouple in metathesis reaction mechanism. Coupling between the acrylic alkene and the vinyl of diene is thermodynamically favored. Even if the diene homopolymerizes through acyclic diene metathesis polymerization (ADMET) pathway, the acrylate can still be inserted into the double bond in the polymer backbone. This mechanism ensures an alternating copolymer as the major product. The degree of polymerization can be controlled by the monomer feed ratio of the multi-functional acrylate to the α,ω-diene. The multi-functional acrylate is preferably fed with a slight excess to prevent crosslinking. The unreacted acrylic alkenes in the resulting alternating copolymers are available for anchoring late transition metal α-diimine complexes in forming multi-nuclear initiators.

Useful multi-functional acrylates have 3 or more functionalities, i.e., vinyl terminations, per molecule. The multifunctional acrylate monomer is selected from the group consisting of trimethylolpropane triacrylate (TMPTA), trimethylolpropane ethoxylate triacrylate, glycerol propoxylate (1PO/OH) triacrylate, 1,3,5-triacryloylhexahydro-1,3,5-triazine, tris[2-(acryloyloxy)ethyl]isocyanurate, pentaerythritol tetraacrylate (PETA), di(trimethylolpropane) tetraacrylate, dipentaerythritol hexaacrylate (DPEHA), and the like. PETA is a preferred multi-functional acrylate.

Useful α,ω-dienes have a general formula of $CH_2=CH-CH_2-X-CH_2-CH=CH_2$, wherein X can be any linear molecular structure with an atom number of 0 to 1,000, preferably an atom number 2 to 500, and more preferably an atom number of 4 to 100. Useful linear molecular structures can include alkyl groups and ethylene oxide.

The reaction between the multi-functional acrylates and the α,ω-dienes is carried out at a temperature of −40° C. to 120° C., preferably 15° C. to 100° C., and most preferably 20° C. to 80° C. The reaction between the multi-functional acrylates and the α,ω-dienes is preferably carried out at ambient pressure. The reaction between the multi-functional acrylates and the α,ω-dienes is carried out for a time of 1 minute to 170 hours, preferably 10 minutes to 72 hours, and most preferably 30 minutes to 6 hours.

The reaction between the multi-functional acrylates and the α,ω-dienes is carried out in the presence of a catalyst. Preferred catalysts are Grubbs catalysts, such as those described in *The Development of $L_2X_2Ru$=CHR Olefin Metathesis Catalysts: An Organometallic Success Story*, Tina M. Trnka and Robert H. Grubbs, Acc. Chem. Res., 2001, 34 (1), pp 18-29, and *Ruthenium-Based Heterocyclic Carbone-Coordinated Olefin Metathesis Catalysts*, G. C. Vougioukalakis and R. H. Grubbs, Chem. Rev 2010, 110, 1746-1787, which are incorporated herein by reference. Grubbs catalysts are a series of transition metal carbene complexes used as catalysts for olefin metathesis. The transition metal is typically ruthenium. First-generation Grubbs catalysts bear the general formula of $L_2X_2Ru$=CHR, wherein L is typically phosphine and X is halide. In second-generation Grubbs catalysts, one of the phosphine ligands is replaced with an N-heterocyclic carbene ligand.

Figure 4:
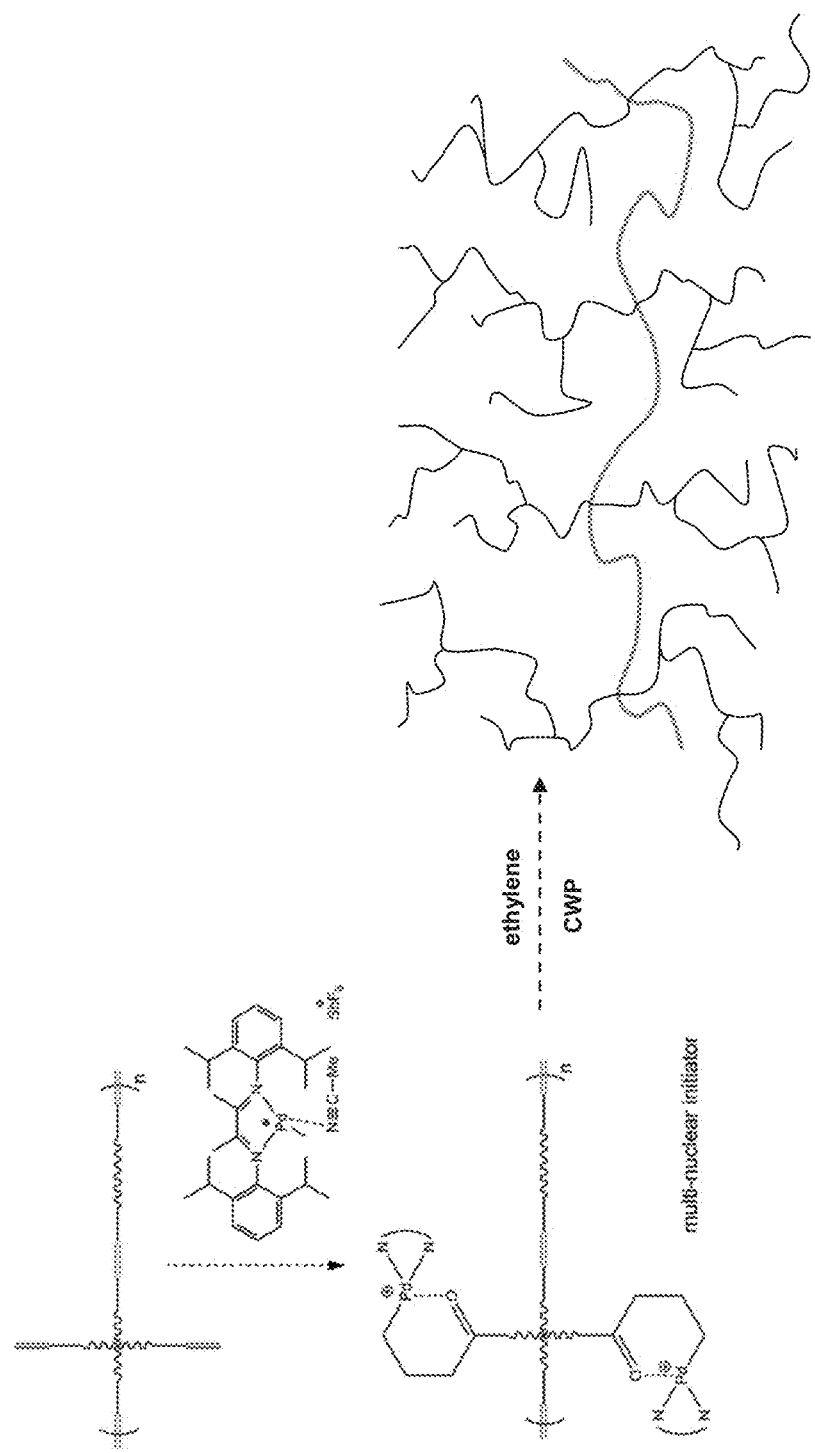
FIG. 4 depicts a reaction sequence for the synthesis of hyperbranched polyethylene via reaction of the alternating acrylate/diene copolymer of FIG. 3 and ethylene in the presence of a second catalyst.

A late transition metal α-diimine catalyst is anchored onto the remaining pendant acrylate alkenes of the initiator precursor (alternating copolymer) leading to an initiator bearing 4 or more initiating sites per molecule (shown in FIG. 4). The multi-nuclear initiator preferably has 4 or more, more preferably 5 to 500, and most preferably 10 to 100 pendant initiating sites. The initiator precursor is the first molecule in FIG. 4, and the multi-nuclear initiator is the second molecule in FIG. 4.

The complexation reaction between the alternating copolymer and the late transition metal α-diimine catalyst is carried out at a temperature of −40° C. to 120° C., preferably 0° C. to 80° C., preferably 15° C. to 60° C., and most preferably ambient temperature. The complexation reaction between the alternating copolymer and the late transition metal α-diimine catalyst is preferably carried out at ambient pressure. The complexation reaction between the alternating copolymer and the late transition metal α-diimine catalyst is carried out for a time of 1 minute to 170 hours, preferably 10 minutes to 72 hours, and most preferably 30 minutes to 48 hours.

The subsequent polymerization of ethylene by the multi-nuclear initiator is carried out at a temperature of −40° C. to 120° C., preferably 0° C. to 80° C., preferably 15° C. to 60° C., and most preferably 20° C. to 40° C. The polymerization of ethylene by the multi-nuclear initiator is carried out at an ethylene pressure of 0 pounds per square inch gauge (psig) to 1500 psig, preferably 1 psig to 750 psig, and most preferably 3 psig to 500 psig. The polymerization of ethylene by the multi-nuclear initiator is carried out for a time of 1 minute to 170 hours, preferably 10 minutes to 72 hours, and most preferably 30 minutes to 48 hours. The complexation reaction and the ethylene polymerization can be carried out sequentially in the same reactor, if desired.

The resulting hyperbranched polyethylene synthesized from the multi-nuclear initiator has arms grown from these pendant initiating sites while having arm molecular weight greater than 1000, more preferably greater than 10,000, and most preferably greater than 50,000. The polyethylene arms are highly branched having 5 to 500 branches per 1,000 carbons and most preferably 10 to 250 branches per 1000 carbons. The overall molecular weight of the hyperbranched polyethylene can be determined by the number of initiating sites per initiator precursor made.

Suitable late transition metal α-diimine catalysts are described in Mechanistic Studies of the *Palladium-Catalyzed Copolymerization of Ethylene and α-Olefins with Methyl Acrylate*, S. Mecking, L. K. Johnson, Line Wang, and M. Brookhart, J. Am. Chem. Soc. 1998, 120, 888-899, and *Late-Metal Catalysts for Ethylene Homo-and Copolymerization*. S. D. Ittel and L. K. Johnson, Chem Rev. 200, 100, 1169-1203, both of which are incorporated herein by reference. The catalysts are also known as Brookhart catalysts. The catalysts are based upon late transition metals, typically nickel and palladium. These catalysts are also referred to as post-metallocene catalysts. They are based upon complexes bearing bulky, neutral, α-diimine (or diketimine) ligands. The catalyst in FIG. 4 has a $SbF_6$ counter anion (the catalyst has a cationic metal center). Other suitable counter anion can include, but are not limited to, $BF_4^-$, $PF_6^-$, $^-OSO_2CF_3$, and $BAF^-$.

If desired, residual unsaturation in the hyperbranched polyethylene can be partially or entirely removed by hydrogenation by any method known in the art. Hydrogenation can be carried out in the process by any known catalysis system, including heterogeneous systems and soluble systems. Soluble systems are disclosed in U.S. Pat. No. 4,284,835 at column 1, line 65 through column 9, line 16 as well as U.S. Pat. No. 4,980,331 at column 3 line 40 through column 6, line 28, all of which is incorporated herein by reference in its entirety. Additional teachings to hydrogenation processes and catalysts are disclosed in U.S. Pat. No. 4,980,331, which is incorporated herein by reference in its entirety.

Additional hydrogenation catalysts are disclosed in Rachapudy et al., Journal of Polymer Science: Polymer Physics Edition, Vol. 17, 1211-1222 (1979). Disclosed catalysts include palladium on various supports (calcium carbonate and barium sulfide) and those formed by reaction between metal alkyls and the organic salts of transition metals.

The hydrogenation reaction herein is normally accomplished at a temperature from 40° C. to 160° C. and preferably from 60° C. to 150° C. Different substrates being hydrogenated will require different optimum temperatures, which can be determined by experimentation. The initial hydrogenation pressures may range up to 3,000 psi partial pressure, at least part of which is present due to the hydrogen. Pressures from 1 to 7500 pounds per square inch gauge (psig) are suitable. Preferred pressures are up to 2000 psig, and most preferred pressures are from 100 to 1000 psig are employed. The reactive conditions are determined by the particular choices of reactants and catalysts. The process may be either batch or continuous. In a batch process, reaction times may vary widely, such as between 0.01 second to 10 hours. In a continuous process, reaction times may vary from 0.1 seconds to 120 minutes and preferably from 0.1 second to 10 minutes. The ratio of catalyst to material being hydrogenated is generally not critical and may vary widely within the scope of the disclosure. Molar ratios of catalyst to material being hydrogenated between 1:1000 and 10:1 are found to be satisfactory; higher and lower ratios, however, are possible.

Hydrogenation catalysts can also be prepared from Group VIII metal compounds, such as Group VIII metal carboxylates having the formula $(RCOO)_n M$, wherein M is a Group VIII metal, R is a hydrocarbyl radical having from 1 to 50 carbon atoms, preferably from 5 to 30 carbon atoms, and n is a number equal to the valence of the metal M; alkoxides having the formula $(RCO)_n M$, wherein M is again a Group VIII metal, R is a hydrocarbon radical having from 1 to 50 carbon atoms, preferably from 5 to 30 carbon atoms, and n is a number equal to the valence of the metal M; chelates of the metal prepared with beta-ketones, alpha-hydroxycarboxylic acids beta-hydroxycarboxylic acids, beta-hydroxycarbonyl compounds and the like; salts of sulfur-containing acids having the general formula $M(SO_x)_n$ and partial esters thereof; and salts of aliphatic and aromatic sulfonic acids having from 1 to 20 carbon atoms. Preferably, the Group VIII metal will be selected from the group consisting of nickel and cobalt. The metal carboxylates useful in preparing the catalyst include Group VIII metal salts of hydrocarbon aliphatic acids, hydrocarbon cycloaliphatic acids and hydrocarbon aromatic acids.

The hyperbranched polymer is preferably substantially saturated. A polymer is deemed saturated if the incidence of unsaturation is less than 10% and preferably less than 5% and most preferably less than 1% according to solution proton NMR.

The hyperbranched polyethylenes can be used as an additive to increase thickening and viscosity index, deliver shear and oxidative stability, and lower contact friction in conventional lubricant base oils and base stocks. The hyperbranched polyethylenes function effectively in these regards due to their relatively invariant coil dimension and shear stability. The hyperbranched polyethylenes will typically be present at 0.1 wt % to 20 wt %, more typically from 0.25 wt % to 10 wt %, and most typically 0.5 wt % to 5 wt %.

Useful lubricating base stocks include natural oils and synthetic oils. Groups I, II, III, IV and V are broad categories of base stocks developed and defined by the American Petroleum Institute (API Publication 1509) to create guidelines for lubricant base stocks. Group I base stocks have a viscosity index of 80 to 120 and contain greater than 0.03% sulfur and less than 90% saturates. Group II base stocks have a viscosity index of 80 to 120, and contain less than or equal to 0.03% sulfur and greater than or equal to 90% saturates. Group III stocks have a viscosity index greater than 120 and contain less than or equal to 0.03% sulfur and greater than 90% saturates. Group IV includes polyalphaolefins (PAO). Group V base stock includes base stocks not included in Groups I-IV.

The hyperbranched polyethylenes can be used as a blend additive to improve processability and/or mechanical properties of conventional polyethylenes (compared to polyethylenes without the hyperbranched polyethylenes). Properties that can be improved or enhanced include extensional hardness, shear thinning, and melt strength. Blends of hyperbranched polyethylenes and conventional polyethylenes typically have from 0.1 wt % to 20 wt %, more typically from 0.25 wt % to 10 wt %, and most typically from 0.5 wt % to 5 wt % hyperbranched polyethylene based on the total weight of the blend. Conventional polyethylenes useful as matrix polymers in the blend include LDPE, LLDPE, mLLDPE, HDPE, and VLDPE (very low density polyethylene).

The hyperbranched polyethylenes can also be used as thermoset rubbers and elastomers. The hyperbranched polyethylenes are amorphous and exhibit low glass transition temperatures and high core chain densities due to their extensive branching. The extensive branching results in low gas permeability and high barrier properties.

The following are examples of the present disclosure and are not to be construed as limiting.

EXAMPLES

Example 1

Figure 1:
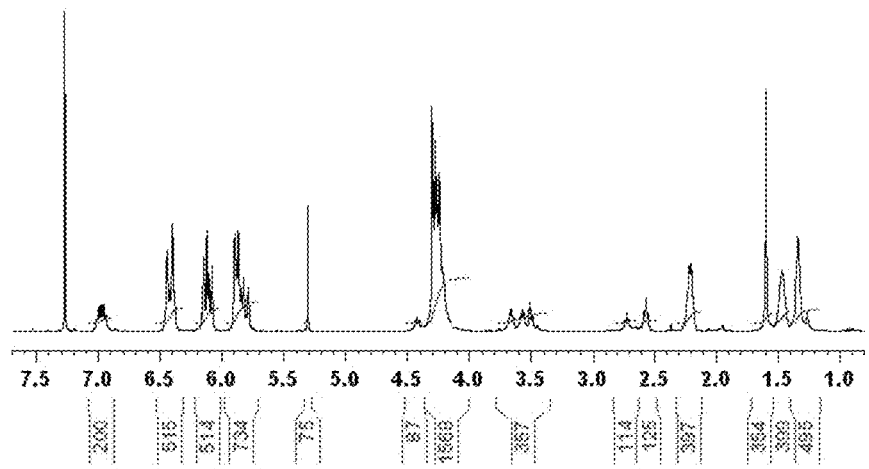
FIG. 1 depicts an $^1$H NMR Spectrum of the product in Example 1.

A flask was charged with 6 mmol tetraacrylate PETA, 3 mmol 1,9-decadiene and 15 mL dichloromethane (DCM). A 1 mL DCM solution containing 25 mg (0.03 mmol) Grubbs $2^{nd}$ generation catalyst (1,3-Bis(2,4,6-trimethylphenyl)-2-imidazolidinylidene)dichloro(phenylmethylene)(tricyclohexylphosphine)ruthenium) was then injected into this stirred monomer solution. The reaction mixture was stirred at 40° C. overnight followed by quenching with several drops of ethyl vinyl ether. Silica gel was added and the mixture was stirred at room temperature for several hours. The silica gel was filtered off and the organic solution was dried. The crude product was confirmed by $^1H$ NMR (FIG. 1) as a majority of PETA-diene-PETA trimer. Mass spectrometry also confirmed the presence of theoretical molecular ions as major peaks (Table 1). This trimer (n=1 in Scheme 1) theoretically has 6 unreacted acrylic double bonds in one molecule and can provide 6 initiating sites per initiator molecule if all the 6 unreacted acrylic double bonds successfully react with Pd α-diimine complexes (not carried out).

TABLE 1

(The Most Abundant Molecular Ion Peaks Observed in the Mass Spectrometry)

| Molecular Ion | Calculated | Observed |
| --- | --- | --- |
| $[C_{40}H_{50}O_{16} + H]^+$ | 787.3 | 786.9 |
| $[C_{40}H_{50}O_{16} + NH_4]^+$ | 804.3 | 803.9 |

Example 2

Figure 2:
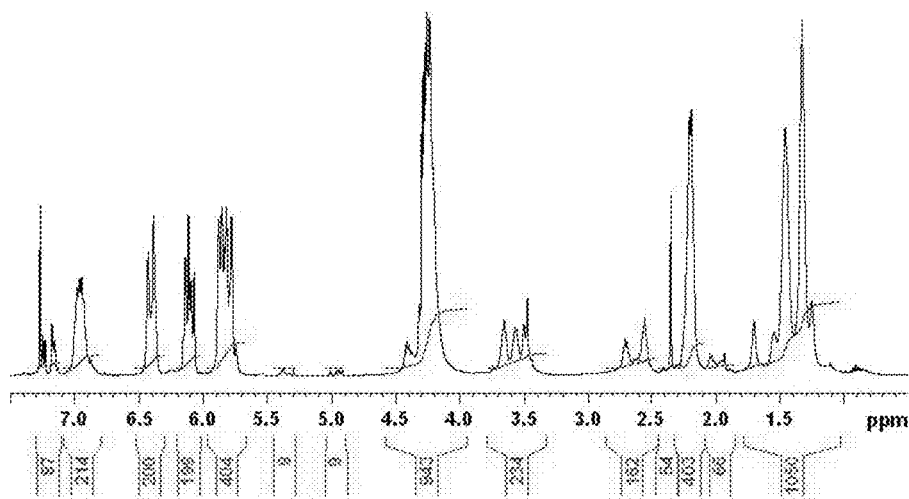
FIG. 2 depicts an $^1$H NMR Spectrum of the product in Example 2.

A flask was charged with 1 mmol tetraacrylate PETA, 0.9 mmol 1,9-decadiene and 9.5 mL DCM. A 1 mL DCM solution containing 8.5 mg (0.01 mmol) Grubbs $2^{nd}$ generation catalyst ((1,3-Bis(2,4,6-trimethylphenyl)-2-imidazolidinylidene)dichloro(phenylmethylene)(tricyclohexylphosphine)ruthenium) was then injected into this stirred monomer solution. The reaction mixture was stirred at 40° C. overnight followed by quenching with several drops of ethyl vinyl ether. The reaction mixture was passed through a short silica gel column. The organic solution was dried. The crude product was confirmed by $^1H$ NMR (FIG. 2) as a majority of "19mer" (n=9 in Scheme 1). This "19mer" theoretically has 22 unreacted acrylic double bonds in one molecule and can provide 22 initiating sites per initiator molecule if all the unreacted acrylic double bonds successfully react with Pd α-diimine complexes (not carried out).

The alternating copolymers made in Examples 1 and 2 can subsequently complex with late transition metal α-diimine catalysts and the resulting multi-nuclear initiators can polymerize ethylene to form hyperbranched polyethylenes via chain walking polymerization. FIG. 4 depicts a suitable reaction pathway and multifunctional catalyst.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A process for making a hyperbranched polyethylene, comprising:
   a) reacting a multifunctional acrylate monomer with a α,ω-diene monomer in the presence of a first catalyst to form an alternating acrylate/diene copolymer;
   b) reacting the alternating acrylate/diene copolymer with a late transition metal α-diimine catalyst to form a multi-nuclear initiator; and
   c) reacting the multi-nuclear initiator with ethylene.

2. The process of claim 1, further comprising hydrogenating the hyperbranched polyethylene.

3. The process of claim 1, wherein the α,ω-diene monomer has the general formula $CH_2=CH-CH_2-X-CH_2-CH=CH_2$, wherein X is a linear molecular structure with an atom number of 0 to 1,000.

4. The process of claim 3, wherein the α,ω-diene monomer is 1,9-decadiene.

5. The process of claim 1, wherein the multifunctional acrylate monomer is selected from the group consisting of pentaerythritol tetraacrylate, trimethylolpropane triacrylate, trimethylolpropane ethoxylate triacrylate, glycerol propoxylate (1PO/OH) triacrylate, 1,3,5-triacryloylhexahydro-1,3,5-triazine, tris[2-(acryloyloxy)ethyl]isocyanurate, di(trimethylolpropane) tetraacrylate, and dipentaerythritol hexaacrylate.

6. The process of claim 5, wherein the multifunctional acrylate monomer is pentaerythritol tetraacrylate.

7. The process of claim 1, wherein the multifunctional acrylate monomer is in slight molar excess compared to the α,ω-diene monomer.

8. The process of claim 1, wherein the first catalyst is a Grubbs catalyst.

9. The process of claim 1, wherein the metal moiety of the late transition metal α-diimine catalyst is selected from the group consisting of palladium and nickel.

10. The process of claim 1, wherein the late transition metal α-diimine catalyst is a Pd α-diimine complex.

11. A process for making a multi-nuclear initiator, comprising:
   (a) reacting a multifunctional acrylate monomer with a α,ω-diene monomer in the presence of a first catalyst to form an alternating acrylate/diene copolymer and
   (b) reacting the alternating acrylate/diene copolymer with a late transition metal α-diimine catalyst to form a multi-nuclear initiator.

12. A hyperbranched polymer, comprising: a backbone of an alternating copolymer of a multifunctional acrylate monomer and a α,ω-diene monomer and a plurality of hyperbranched polyethylene branches.

13. The polymer of claim 12, wherein the α,ω-diene monomer has the general formula $CH_2=CH-CH_2-X-CH_2-CH=CH_2$, wherein X is a linear molecular structure with an atom number of 0 to 1,000.

14. The polymer of claim 13, wherein the α,ω-diene monomer is 1,9-decadiene.

15. The polymer of claim 12, wherein the multifunctional acrylate monomer is selected from the group consisting of pentaerythritol tetraacrylate, trimethylolpropane triacrylate, trimethylolpropane ethoxylate triacrylate, glycerol propoxylate (1PO/OH) triacrylate, 1,3,5-triacryloylhexahydro-1,3,5-triazine, tris[2-(acryloyloxy)ethyl]isocyanurate, di(trimethylolpropane) tetraacrylate, and dipentaerythritol hexaacrylate.

* * * * *